(12) United States Patent
Blachowicz et al.

(10) Patent No.: US 12,216,800 B2
(45) Date of Patent: Feb. 4, 2025

(54) SYSTEMS AND METHODS FOR USE IN IMPOSING A COMMON DOMAIN

(71) Applicant: MASTERCARD INTERNATIONAL INCORPORATED, Purchase, NY (US)

(72) Inventors: Tomasz Blachowicz, Lodz (PL); Harjender Singh, Singapore (SG); Edward Neil Livingston, Dunfermline (GB); Holger Kunkat, Neumuenster (DE); Ryan Watkins, Brooklyn, NY (US); Michael D. McCarthy, Denver, CO (US); Maurice David Liscia, Long Island City, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 149 days.

(21) Appl. No.: 18/079,798

(22) Filed: Dec. 12, 2022

(65) Prior Publication Data

US 2023/0222246 A1    Jul. 13, 2023

Related U.S. Application Data

(60) Provisional application No. 63/297,490, filed on Jan. 7, 2022.

(51) Int. Cl.
*G06F 21/62* (2013.01)
*H04L 9/40* (2022.01)

(52) U.S. Cl.
CPC ........ *G06F 21/6263* (2013.01); *H04L 63/102* (2013.01)

(58) Field of Classification Search
CPC ............ G06F 21/6263; G06F 11/3688; G06F 16/24578; G06F 16/26; G06F 16/951;
(Continued)

(56) References Cited

U.S. PATENT DOCUMENTS 9,838,727 B1    12/2017  Chaudhry et al.
9,854,308 B1    12/2017  Chaudhry et al.
(Continued)

FOREIGN PATENT DOCUMENTS

KR    2007-0120125    12/2007

*Primary Examiner* — Le H Luu
(74) *Attorney, Agent, or Firm* — Harness, Dickey & Pierce, P.L.C.

(57) ABSTRACT

Systems and methods are provided for use in implementing a common domain to provide recognition of users. One example computer-implemented method includes receiving a recognition token associated with a profile and setting, via a browser accessing a common domain, a cookie in the browser where the cookie includes a recognition token. The method also includes, in response to a request for a service, via a user, through the browser accessing an entity domain associated with an entity, accessing the common domain and accessing, via the browser accessing the common domain, the cookie and submitting the cookie to a common domain server. The method further includes receiving, from the common domain server, a federated ID token associated with the recognition token for the service and retrieving, via the browser, the profile associated with the user based on the federated ID token.

15 Claims, 15 Drawing Sheets

(58) Field of Classification Search
CPC ... G06F 16/958; G06F 21/31; H04L 63/0807; H04L 63/0815; H04L 63/102; H04L 63/08; G06N 5/041
See application file for complete search history.

(56) References Cited

U.S. PATENT DOCUMENTS

| | | | |
|---|---|---|---|
| 2003/0005118 A1 | 1/2003 | Williams | |
| 2008/0016232 A1* | 1/2008 | Yared | H04L 63/0815 709/229 |
| 2009/0055904 A1* | 2/2009 | Gomi | H04L 63/08 726/4 |
| 2013/0212638 A1* | 8/2013 | Wilson | G06F 11/3688 726/1 |
| 2013/0311910 A1* | 11/2013 | Stambaugh | G06F 16/26 715/760 |
| 2018/0336337 A1 | 11/2018 | Lee | |
| 2019/0163758 A1* | 5/2019 | Zhivotvorev | G06F 16/24578 |
| 2019/0259041 A1* | 8/2019 | Jackson | G06N 5/041 |
| 2021/0397776 A1* | 12/2021 | Abrahami | G06F 16/958 |
| 2022/0038446 A1* | 2/2022 | Caldera | G06F 21/31 |
| 2023/0018983 A1* | 1/2023 | Vilcinskas | G06F 16/951 |

* cited by examiner

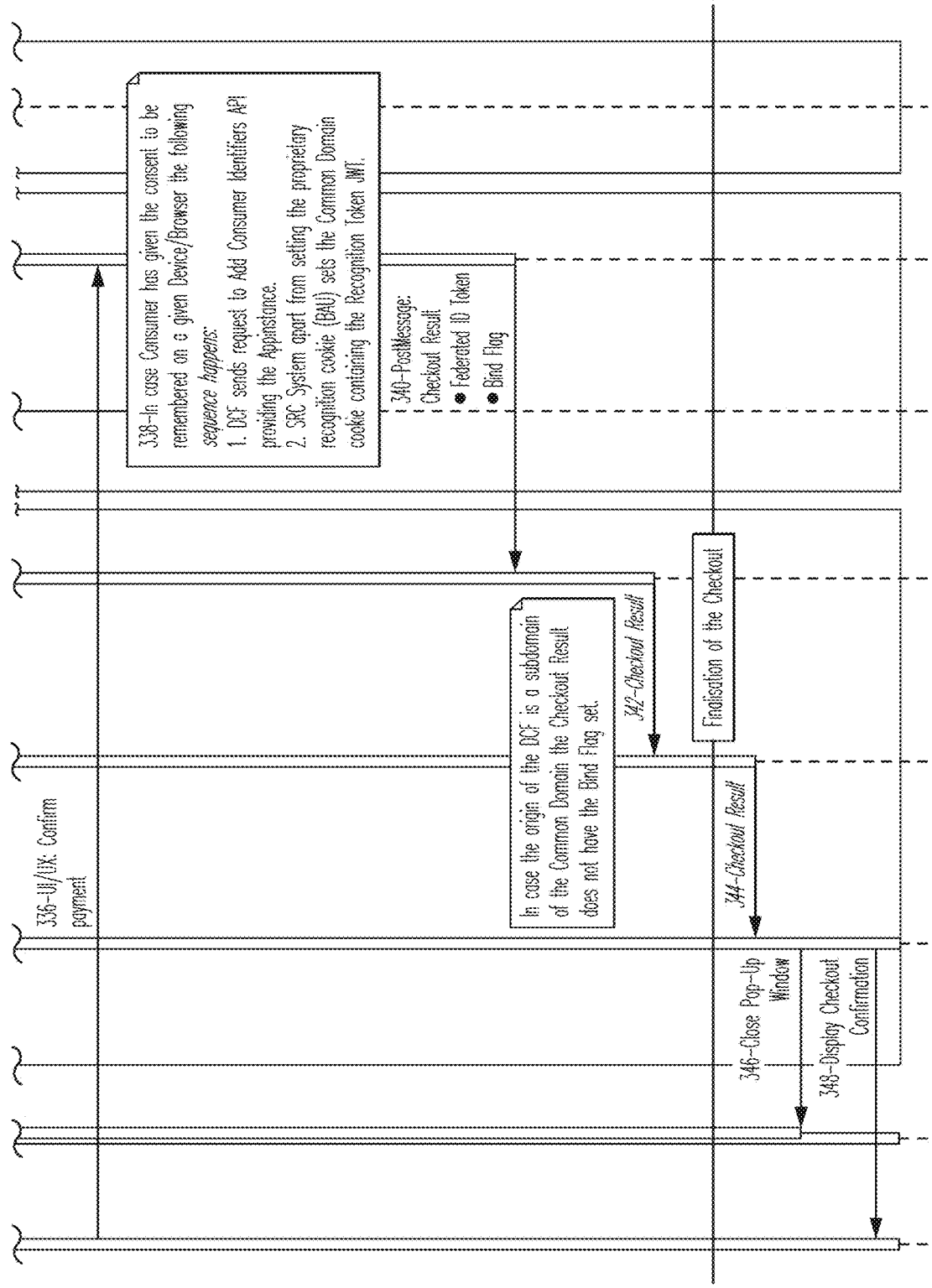

SYSTEMS AND METHODS FOR USE IN IMPOSING A COMMON DOMAIN

CROSS-REFERENCE TO RELATED APPLICATION

This application claims the benefit of, and priority to, U.S. Provisional Application No. 63/297,490, filed Jan. 7, 2022. The entire disclosure of the above application is incorporated herein by reference.

FIELD

The present disclosure generally relates to systems and methods for use in imposing a common domain, for example, in connection with implementing credentials associated with one or more services.

BACKGROUND

This section provides background information related to the present disclosure which is not necessarily prior art.

Users are known to interact with parties through virtual locations associated with the parties. For example, merchants often provide websites, through which users are able to browse through different products, select ones of the products, and purchase the selected products. In connection therewith, it is known for browsers, such as, for example, the APPLE SAFARI browser, etc., to compile cookies associated with the users' interactions with one or more websites. The cookies are set in the browsers and accessible to various websites, to enhance the experience of the users at the various websites. Cookies may, for example, store login states of users, or permit the browsers to access prior searches performed by the users at one or more websites.

DRAWINGS

The drawings described herein are for illustrative purposes only of selected embodiments and not all possible implementations, and are not intended to limit the scope of the present disclosure.

Figure 1:
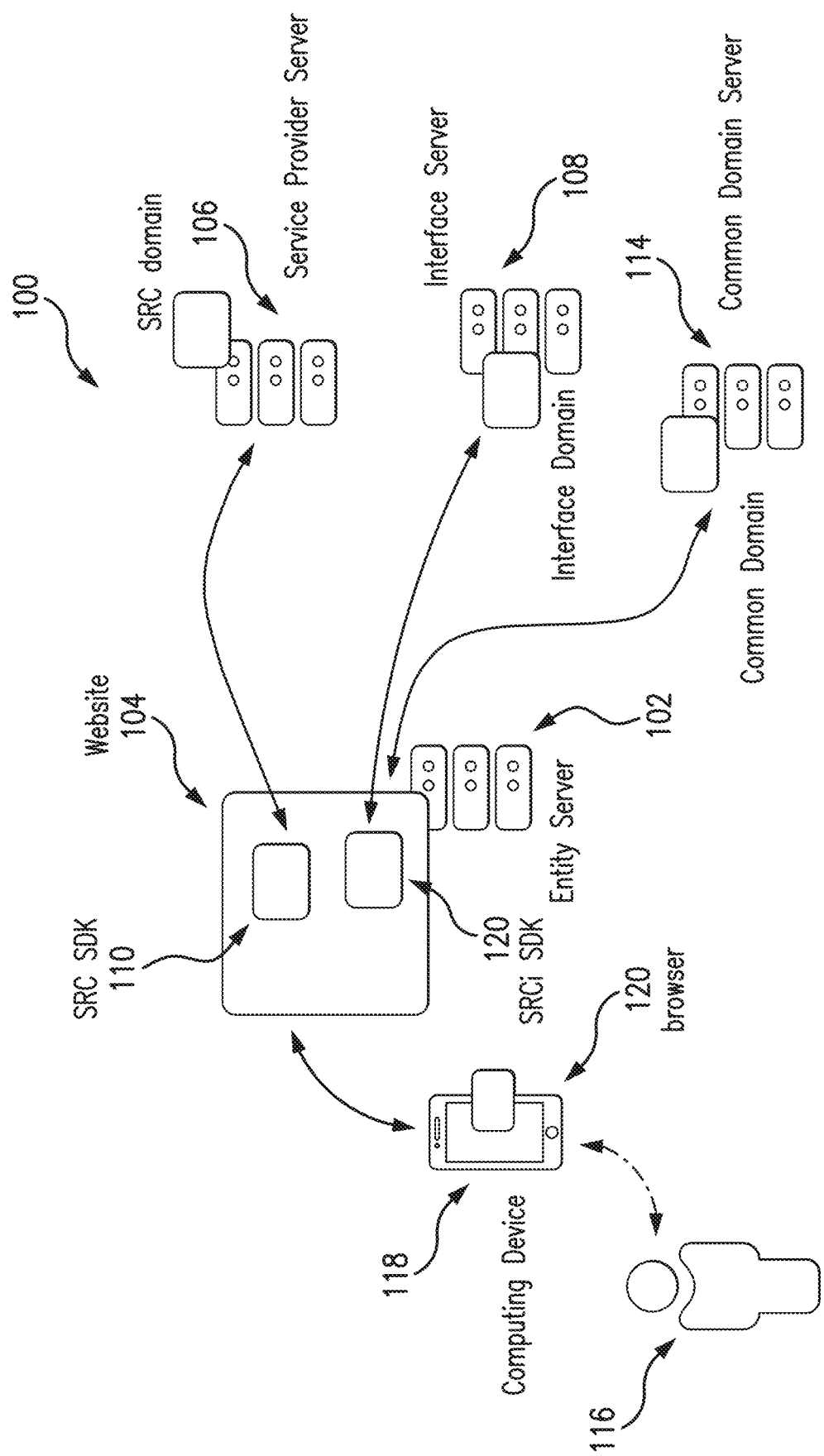
FIG. 1 illustrates an example system of the present disclosure suitable for use in imposing a common domain, whereby a cookie is set in a browser for a computing device in the common domain, and then recalled through the common domain to permit recognized users and/or remembered credentials.
Figure 3A:
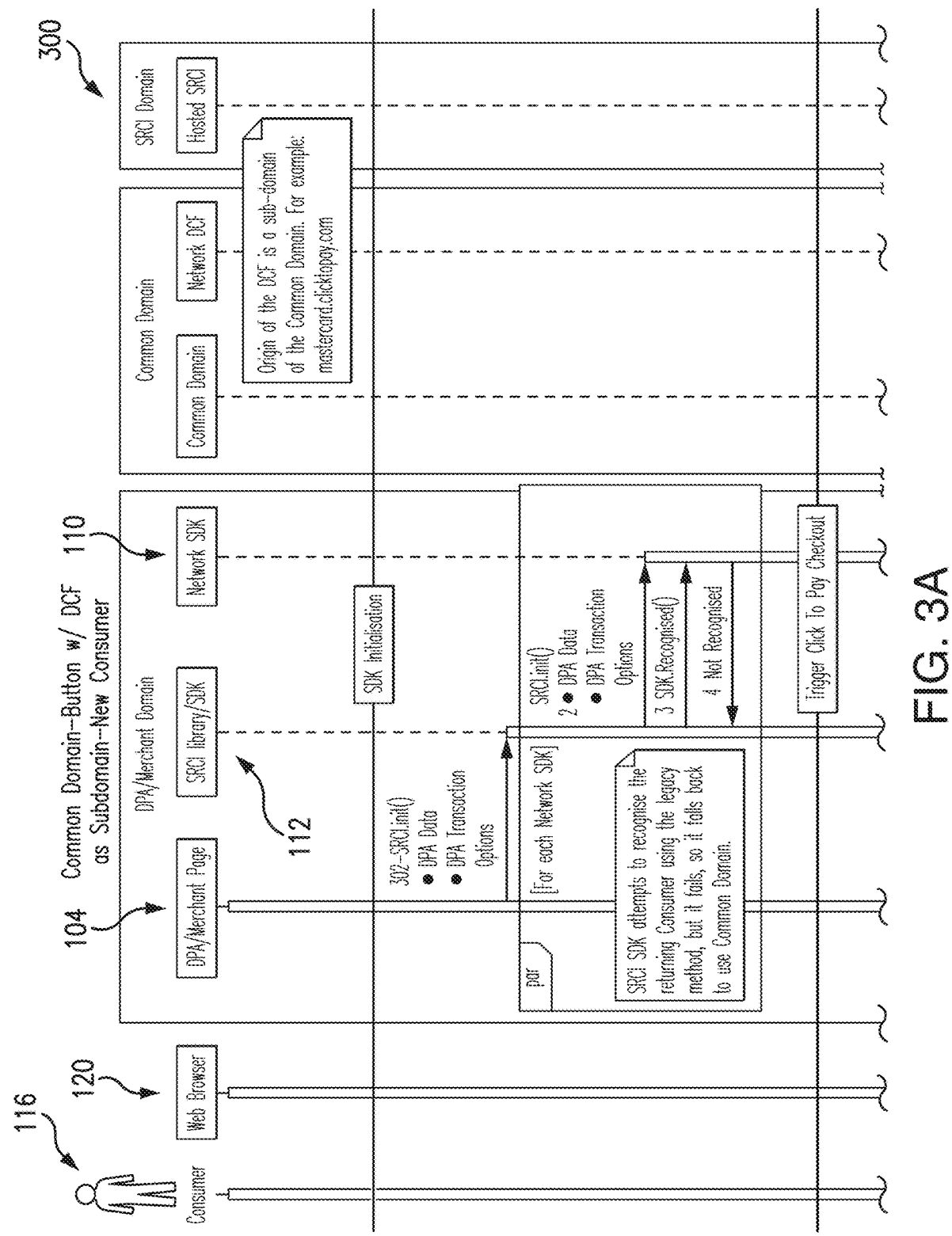
Figure 3B:
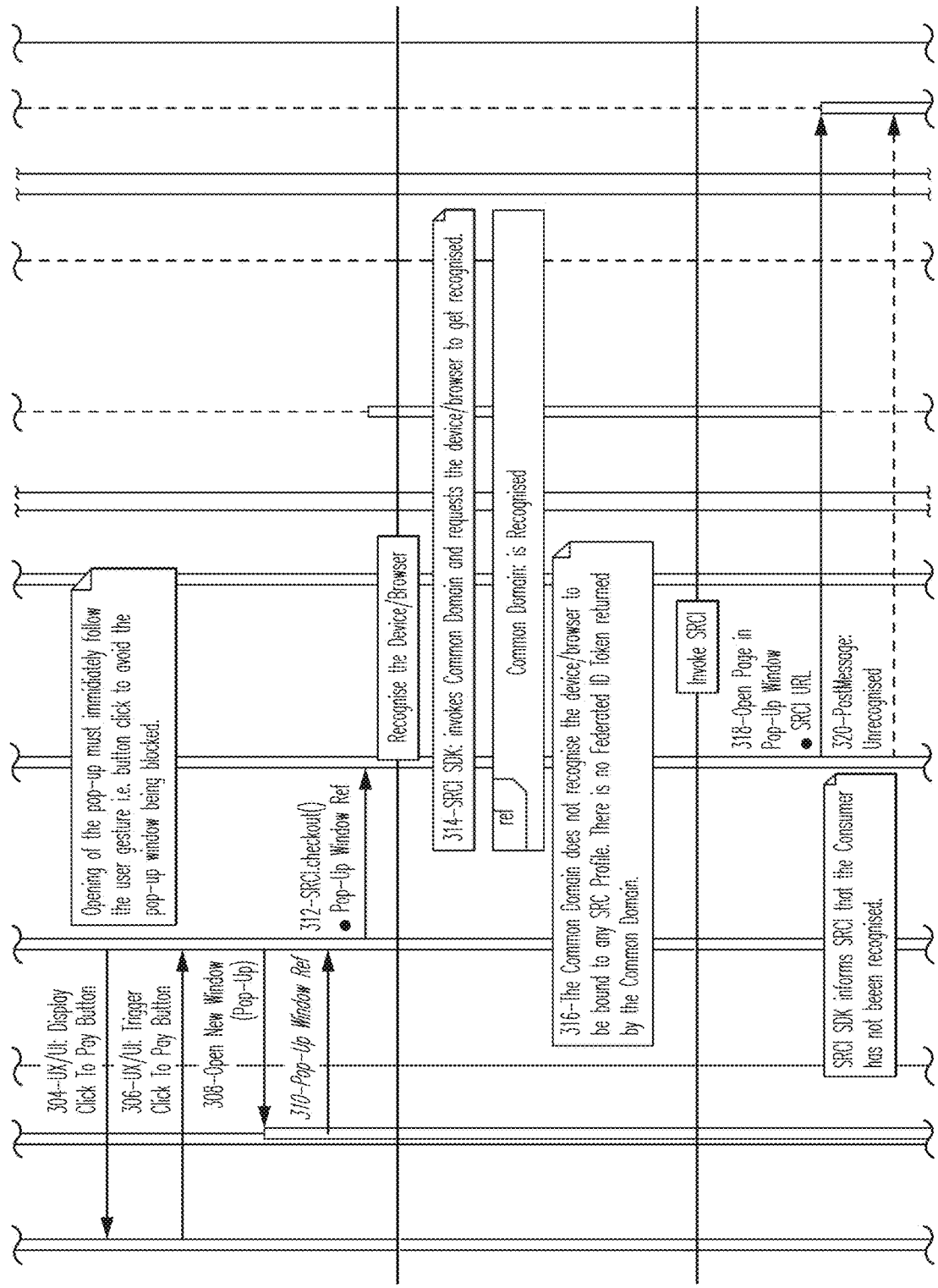
Figure 3C:
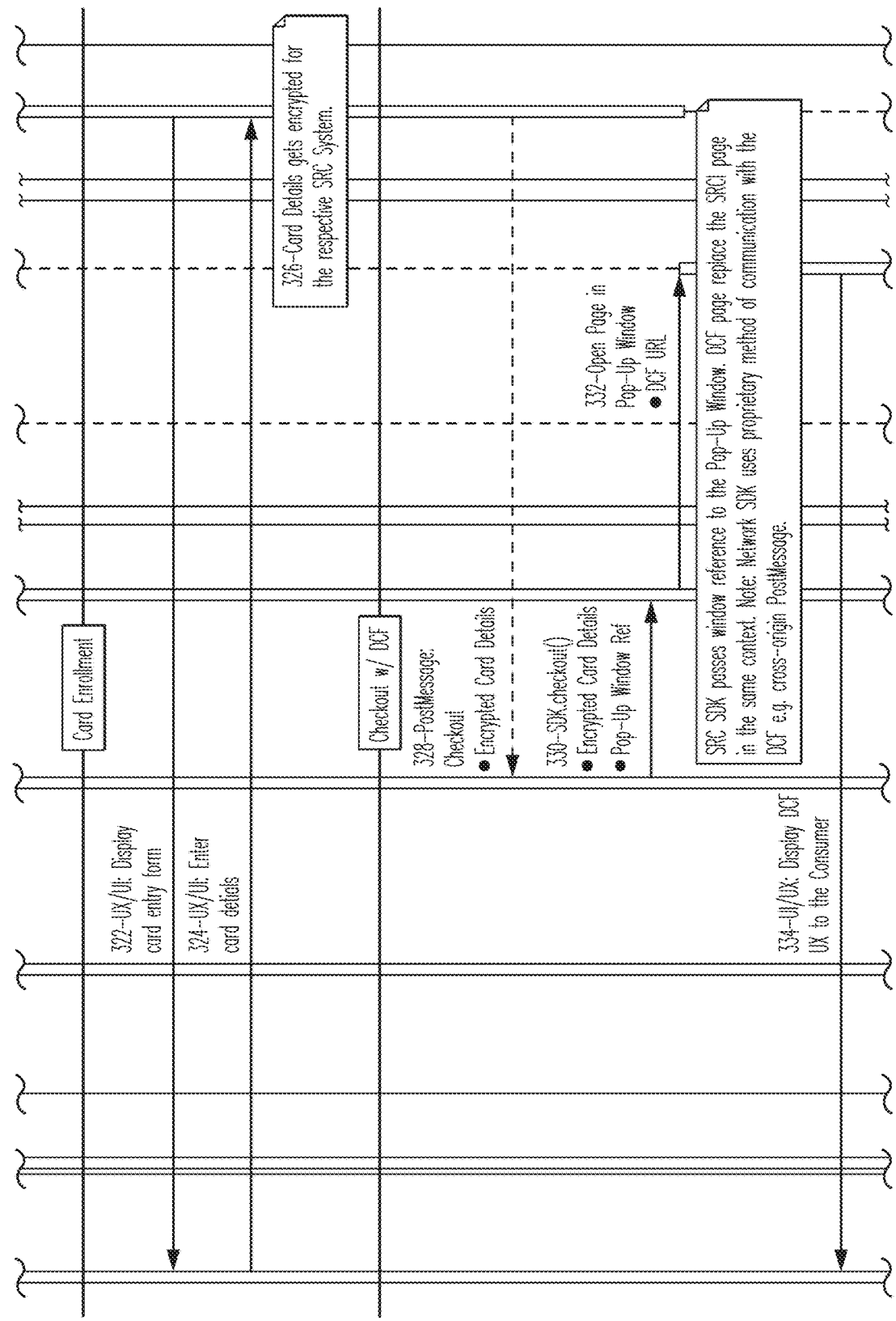
Figure 4:
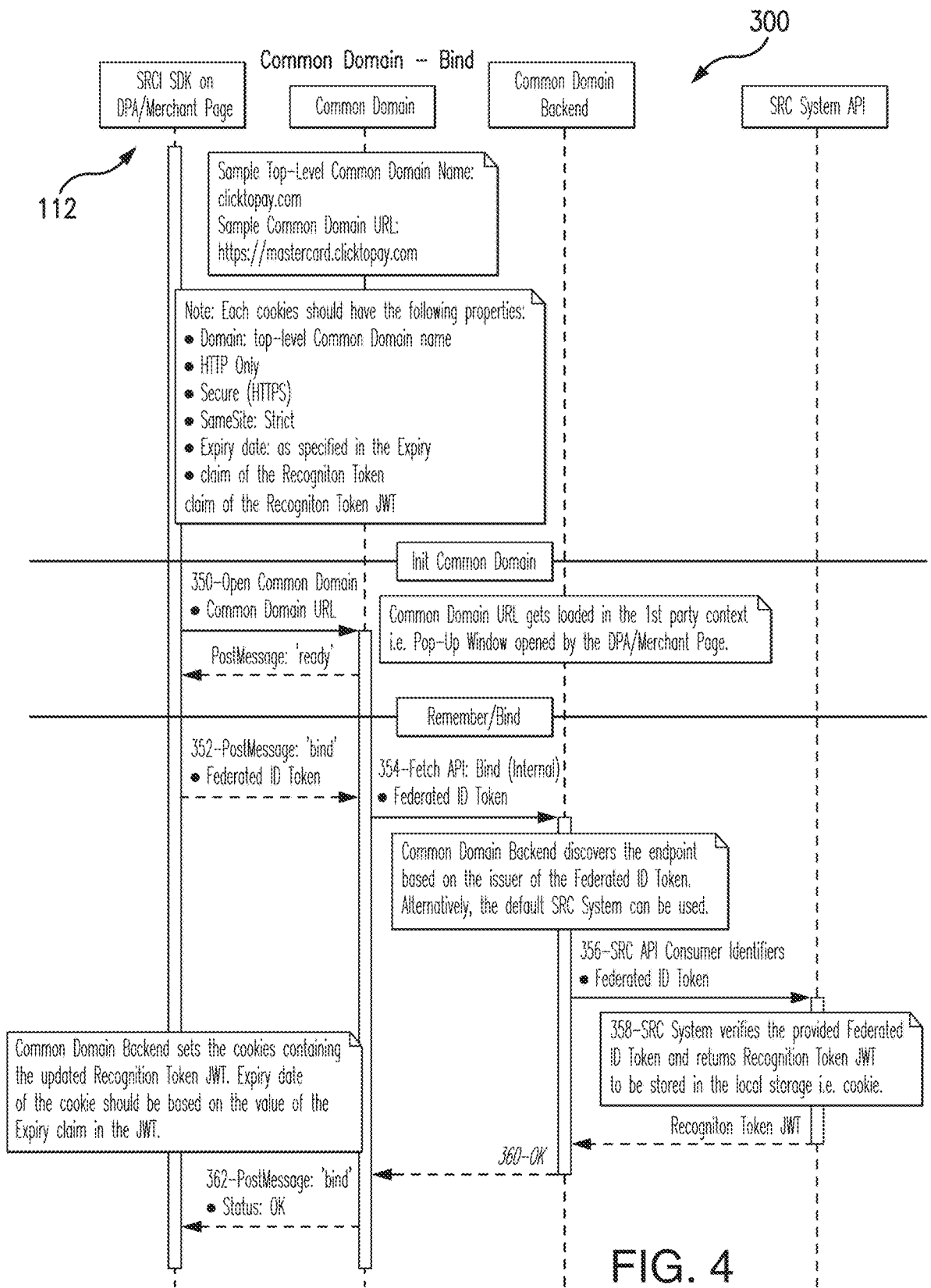
Figure 5A:
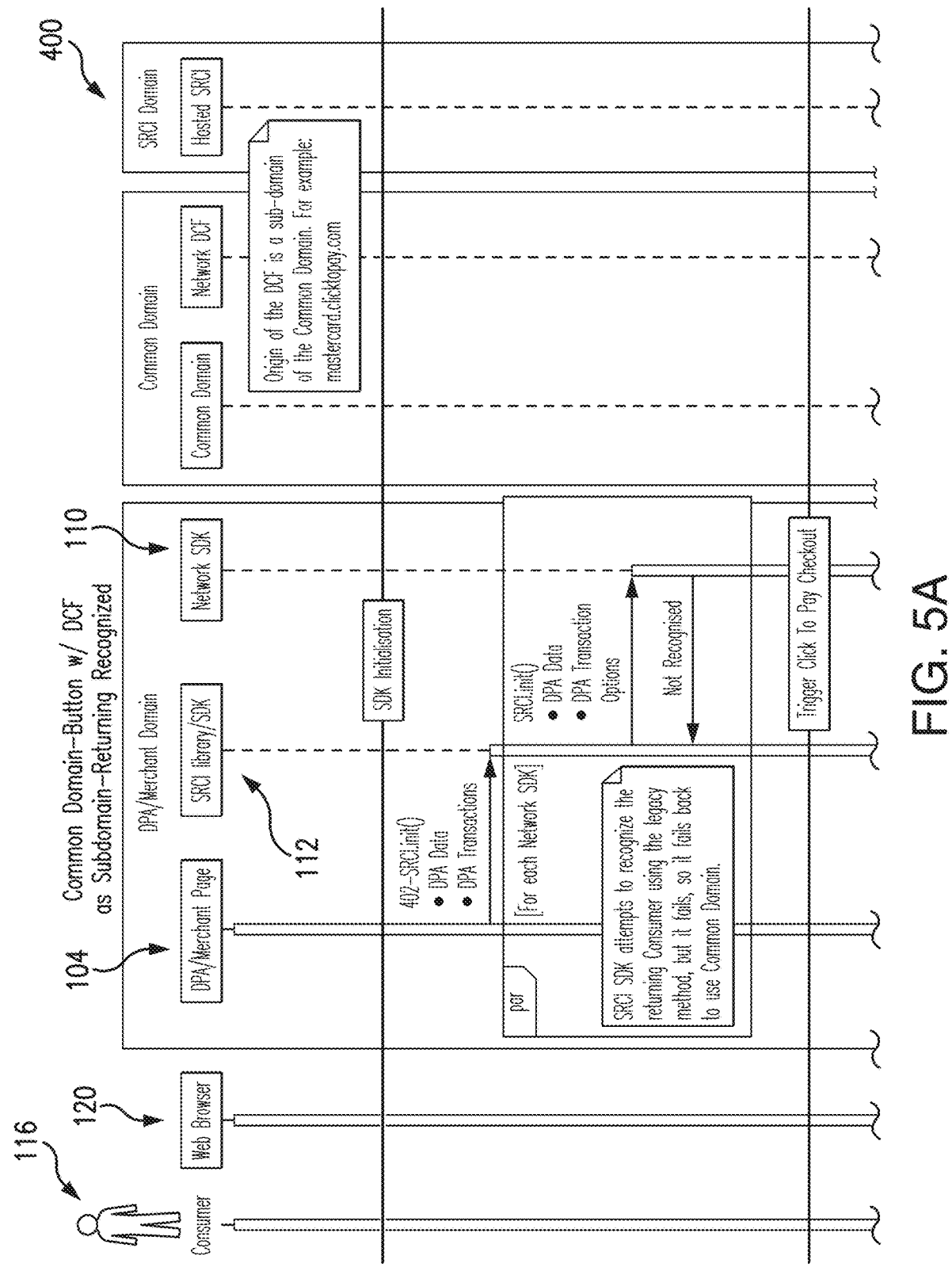
Figure 5B:
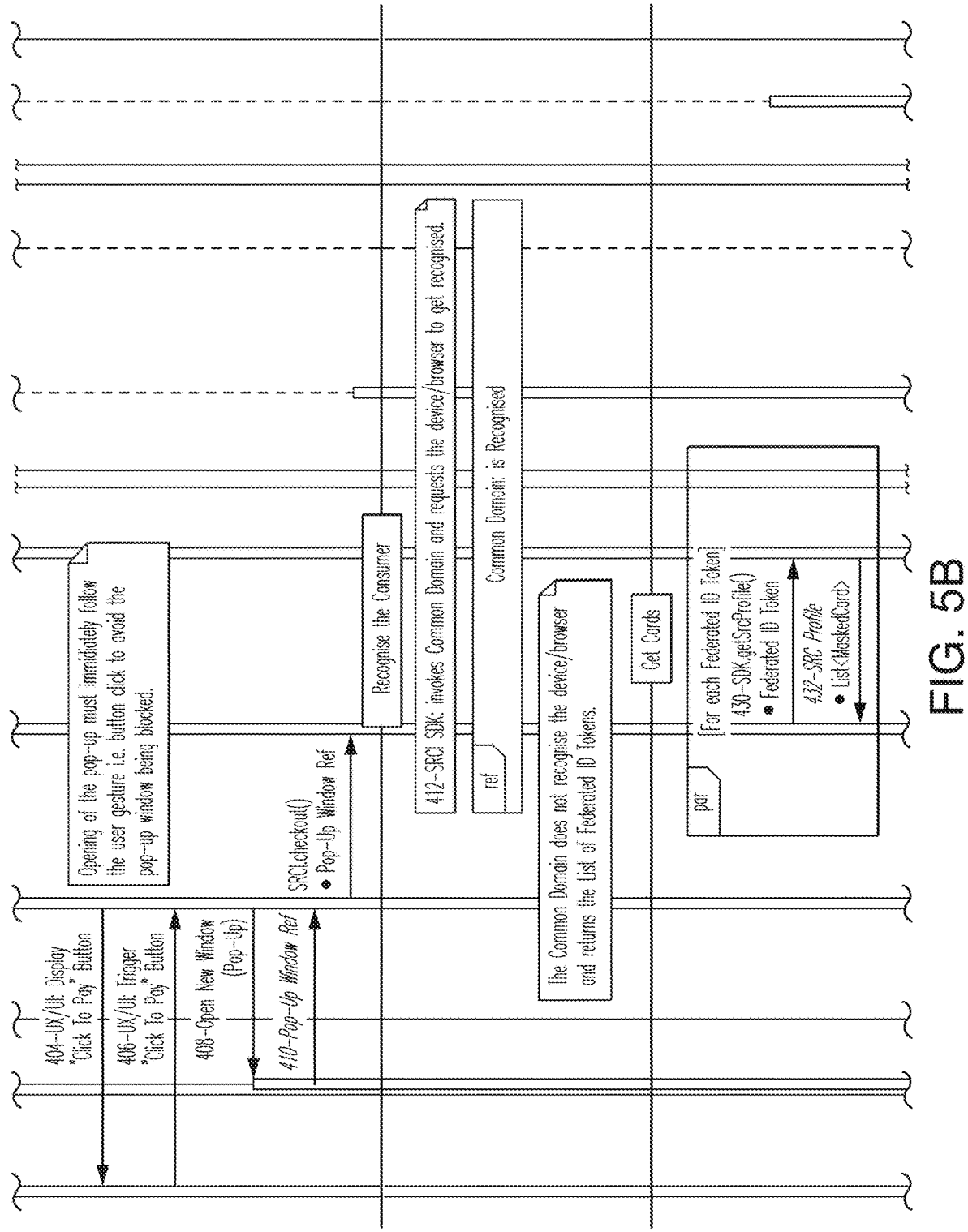
Figure 5C:
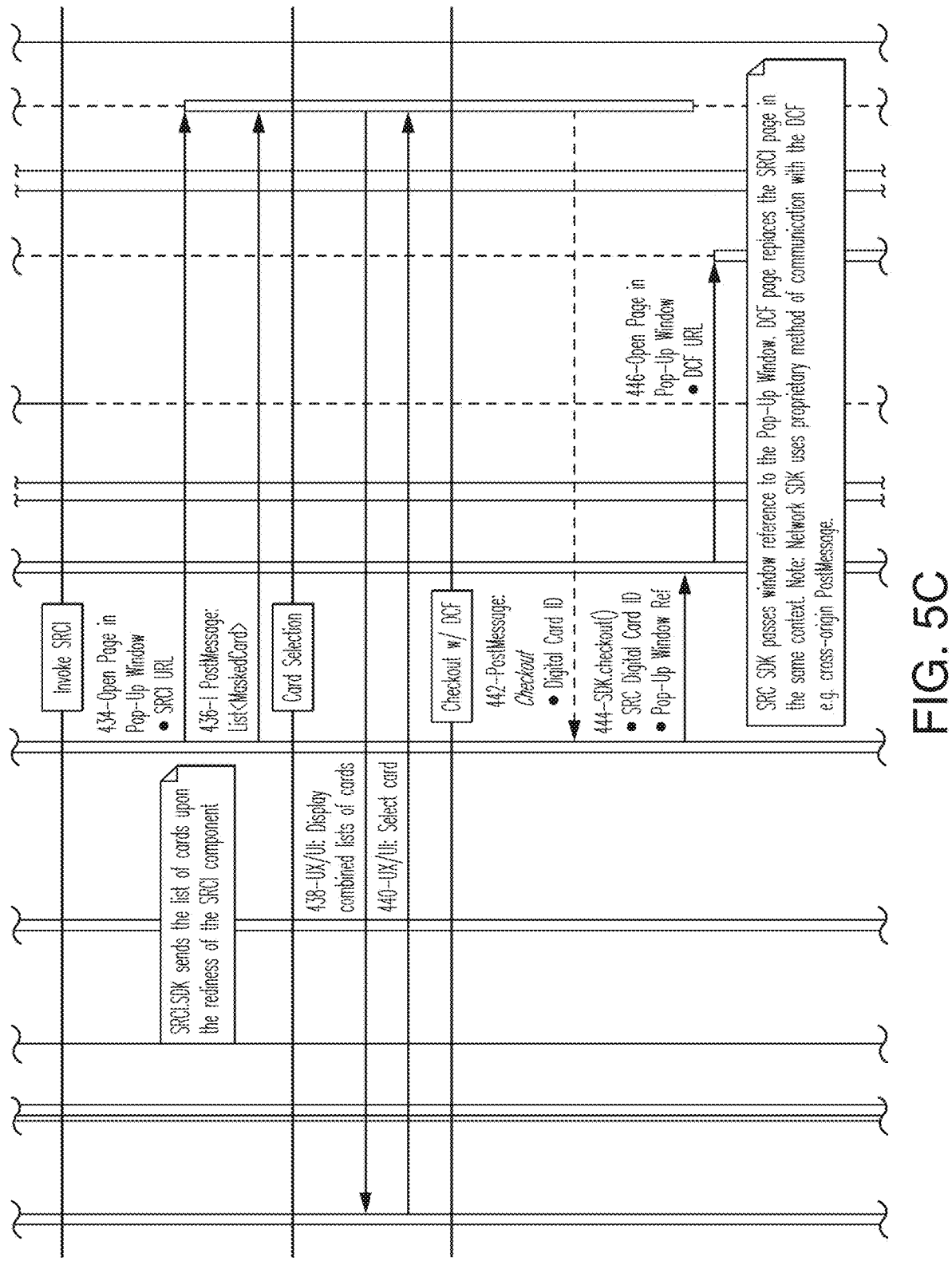
Figure 5D:
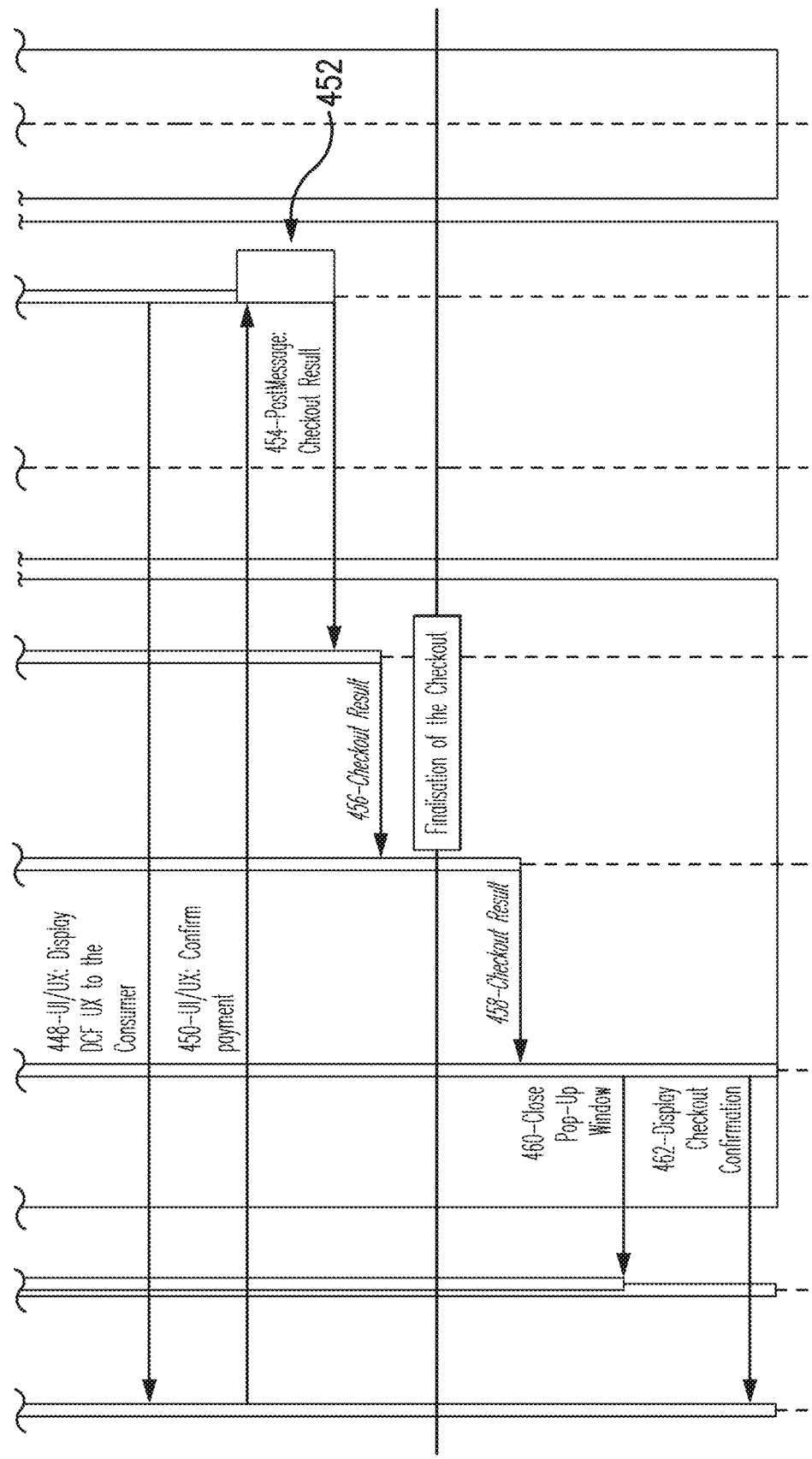
Figure 6A:
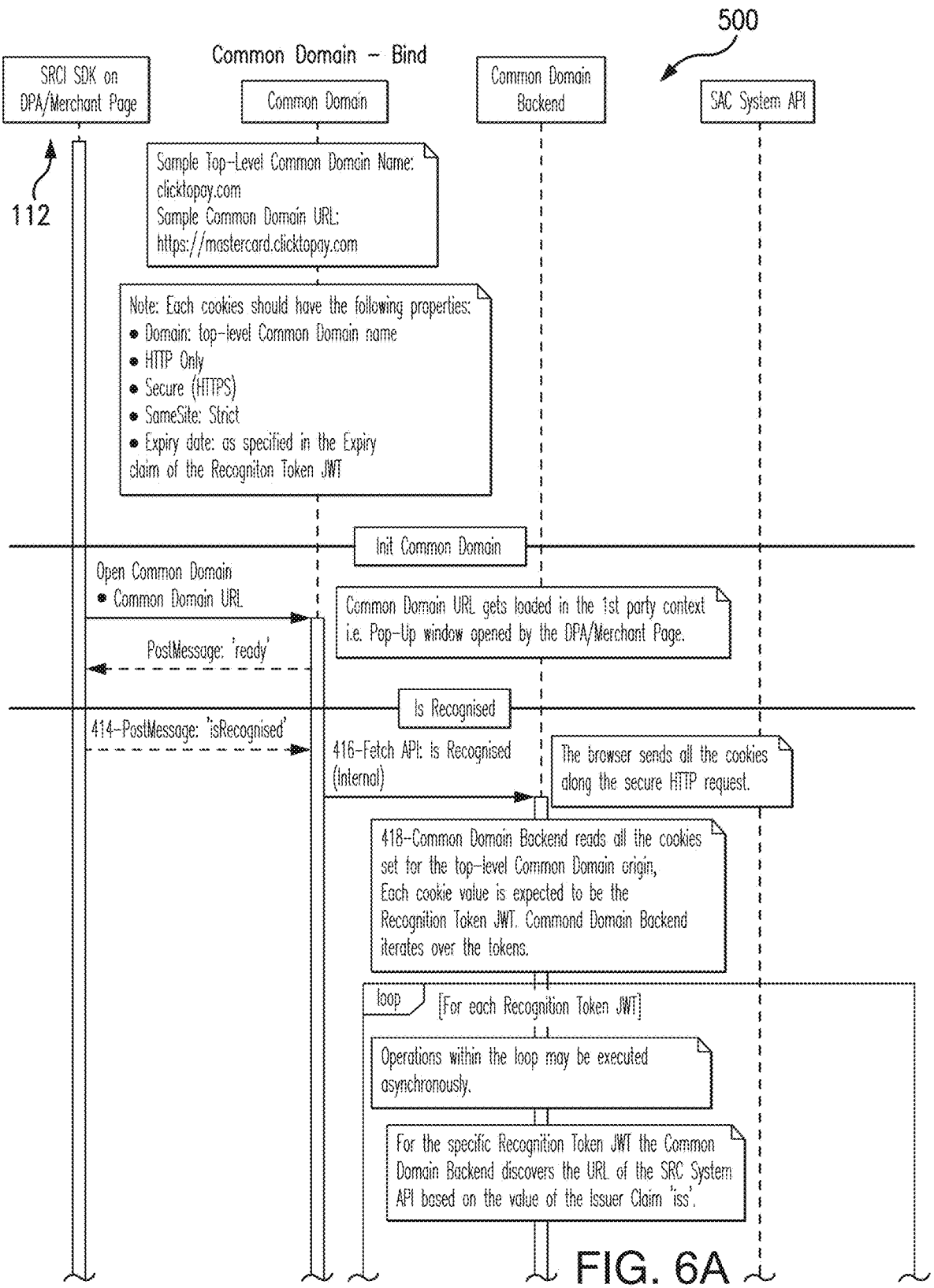
Figure 6B:
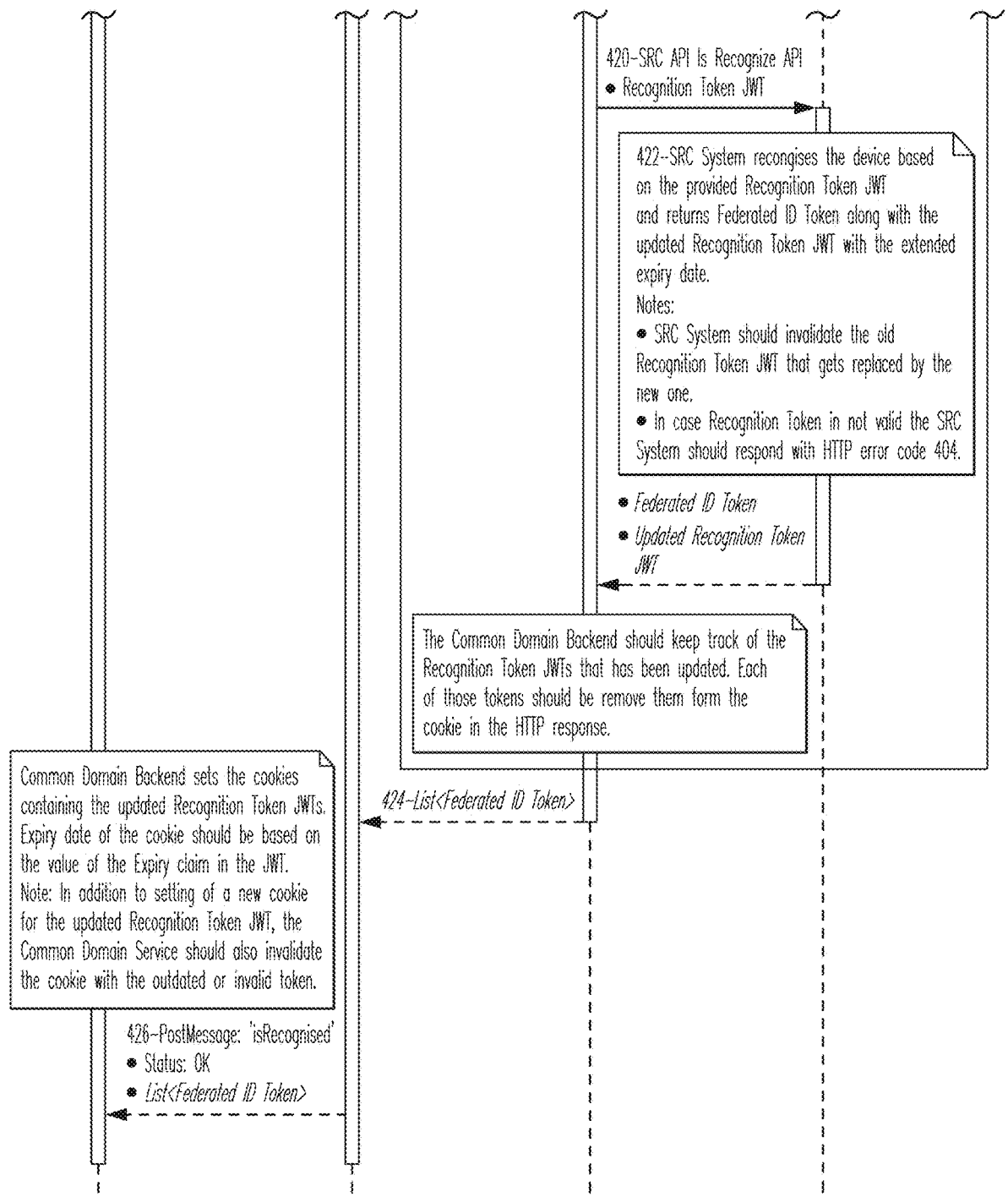
Figure 7A:
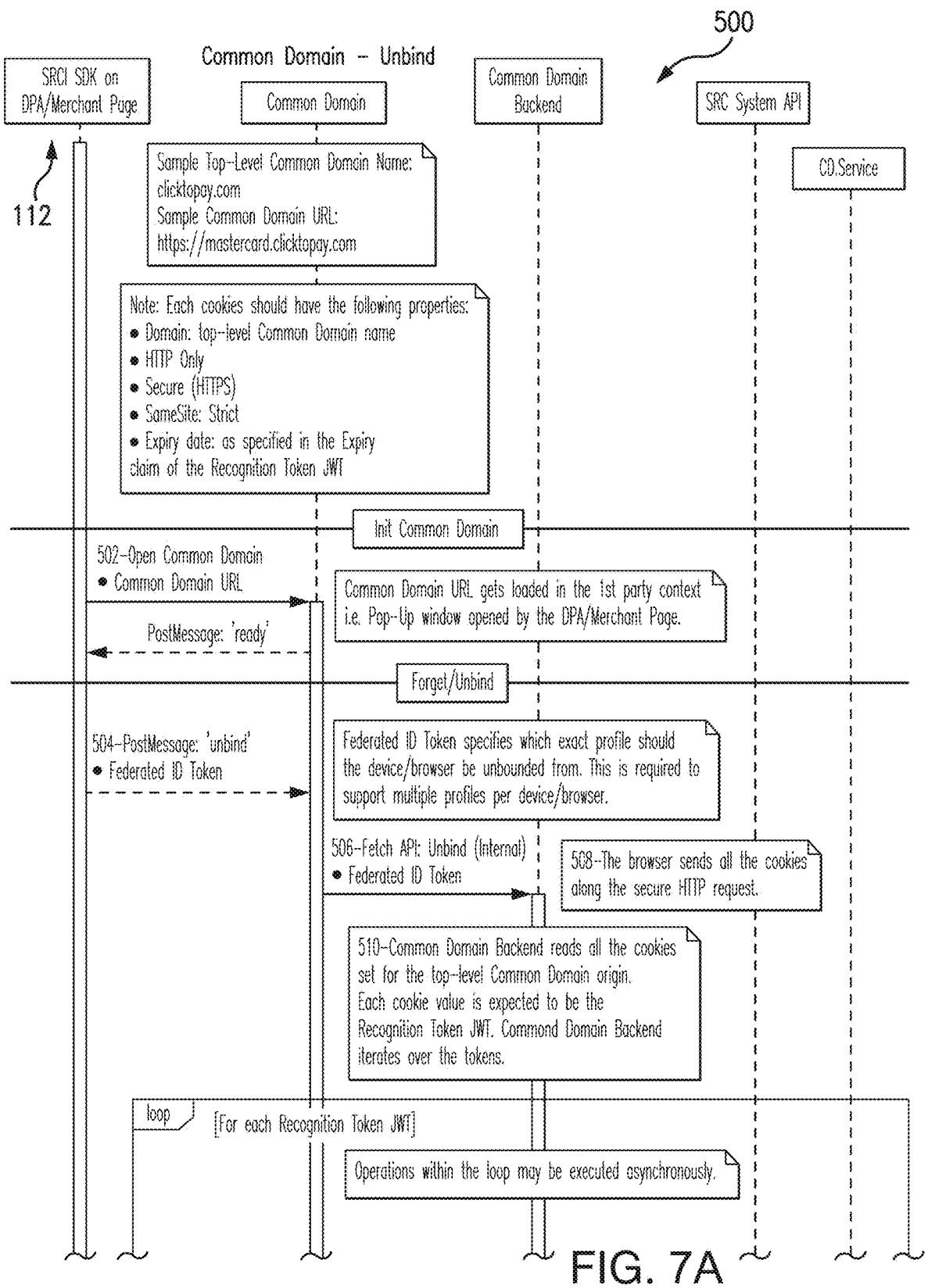
Figure 7B:
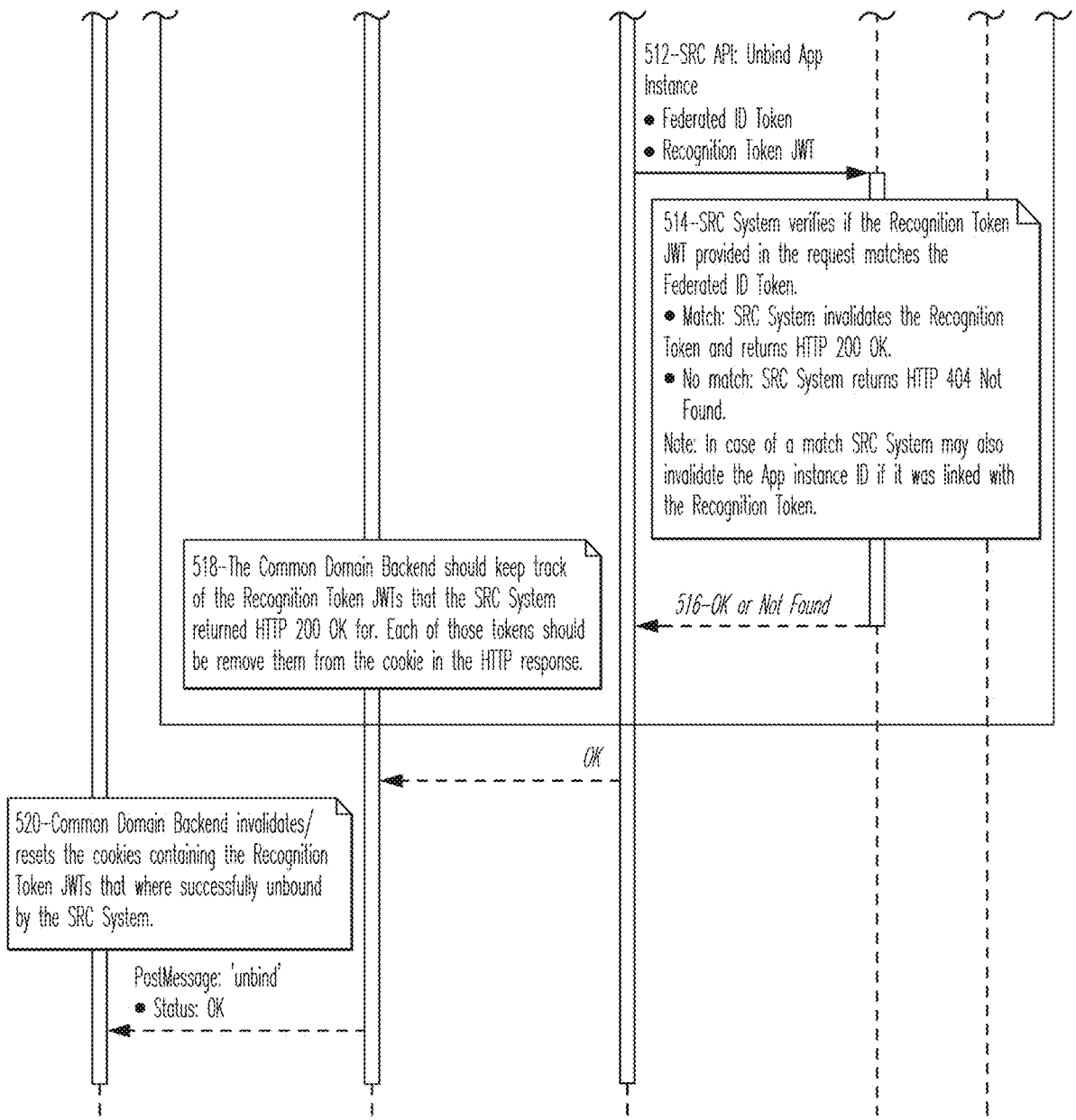

FIGS. 3A-4 illustrate an example method that may be implemented in the system of FIG. 1 for implementing and/or using a common domain for an unrecognized user to a website (or domain) (e.g., a user that is new to (or not remembered by) the website/domain, etc.), where a cookie is set in a browser for a computing device and for a credential associated with the user and/or computing device for use at the website/domain;

FIGS. 5A-6B illustrate another example method that may be implemented in the system of FIG. 1 for implementing and/or using a common domain for a recognized user to a website (or domain) to recall a credential, via a cookie set in a browser for a computing device, to use in connection with one or more services via the website/domain; and FIG. 7A-7B illustrate an example method that may be implemented in the system of FIG. 1 for implementing and/or using a common domain, where a cookie (and associated token, etc.) is unbound from a computing device by invalidating and/or deleting the cookie.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

When a website is accessed through a browser, the browser may set and/or access cookies, in general or related to specific functionality, to enhance the experience of the user at the website, or at the browser in general. In certain instances related to payment services, cookies may be associated with the payment services (e.g., secure remote commerce (SRC), etc.), whereby functionality is extended to the website (e.g., through a software development kit (SDK), etc.) to permit certain credentials to be remembered for later use. In this manner, a domain associated with the SRC, for example, is used to set off the cookie, and then, a website associated with the services (e.g., a merchant website, etc.) utilizes the cookie to initiate the payment services. This is generally understood as a first party cookie in a third-party context.

More recently, to restrict certain activities, and to enhance a user's experience (e.g., prevent certain advertising activities, etc.), browsers have restricted the use of cookies by domains other than an originating domain. As such, use of the cookies by the merchant is then eliminated in the above third-party context, thereby limiting the ability of services, such as, for example, SRC services, to cause users and/or computing devices to be remembered for subsequent transactions.

Uniquely, the systems and methods herein provide for use of a common domain, whereby cookies are set via the common domain and then accessed by one or more services, through the common domain. In particular, a virtual location may provide for services, which are hosted by different service providers. The virtual location provisions credentials associated with the service(s) through the common domain (rather than the service provider domain), via a browser, whereby the common domain is a first party to cookies set in the browser (which include a token linked to the credential). Then, later, to access the credential, the virtual location relies on the common domain to access the token, via the cookie, whereby the common domain is still the first party and not subject to potential restrictions associated with third-party use and/or access to cookies and/or tokens. The token is then submitted to the service, and the credential is returned for use by the virtual location. In this manner, credentials provisioned through the common domain may be accessed by other virtual locations while through the same device (and browser), thereby providing for enhanced functionality across multiple virtual locations, while still accommodating enhanced security restrictions associated with different browsers.

FIG. 1 illustrates an example system 100 in which one or more aspects of the present disclosure may be implemented. Although the system 100 is presented in one arrangement, other embodiments may include systems arranged otherwise depending, for example, on types and numbers of domains available in the system, browser settings and/or restrictions, physical implementation of the domains, privacy concerns, etc.

In the illustrated embodiment, the system 100 includes multiple different servers, each hosting a different domain. In particular, the system 100 includes an entity server 102 associated with a first entity (and which is generally represented by the server 102). The entity may include, for example, a merchant, a service provider, or another entity, which receives credentials from one or more users at one or more regular or irregular intervals (e.g., whereby storing the credential may be desired, etc.). In this specific example, the entity is a merchant, and the merchant offers one or more product (or services) for sale through a virtual location, such as, for example, a website 104. The website 104 is accessible through an entity domain (e.g., www. [merchant_name] .com, etc.).

In addition to the entity server 102, the system 100 also includes a service provider, which is associated with one or more services. The service provider is represented by the server 106 in FIG. 1. In this example, a service offered by the service provider includes a secure remote commerce (SRC) service, which is available to the entity and specifically the entity server 102, via a service domain (e.g., example_SRC_service.com (or SRC domain), etc.). It should be appreciated that several different service providers (and associated servers) may be included in other embodiments (each offering a SRC service, or different service). As illustrated, the system 100 also includes an interface server 108, which is associated with the service provider (and service provider server 106). The interface server 108 is configured, as described herein, to provide an interface between users and the SRC service/domain, via an interface domain (e.g., example_SRCi_service.com, etc.). In connection with the above, the system 100 includes an SRC software development kit (SDK) 110 associated with the service provider server 106 and an SRCi SDK 112 associated with the interface server 108, where each is included in the entity domain (e.g., in website 104, etc.) to facilitate communication between the entity server 102 and the respective servers 106, 108, as described below.

The system 100 further includes a common domain server 114, which is configured to provide cooperation between the entity server 102 and the service provider and interface servers 106, 108, through a common domain (e.g., common_domain.com, etc.), as described below. That said, while the interface domain (associated with the interface server 108) and the common domain (associated with the common domain server 114) are illustrated as separate parts of the system 100 in FIG. 1, it should be appreciated that in some embodiments the interface domain could host the common domain (e.g., via the interface server 108, etc.).

While the above example is generally described with reference to the SRC service (as offered by the service provider (e.g., via the service provider server 106, etc.)), it should be appreciated that the present disclosure is not limited to the SRC service, or even to commerce (or commerce-based services) in general. The present disclosure may be implemented in other instances and/or for other subject matter (and/or for other services) (e.g., informational services such as provided by news domains that involve subscriptions, media streaming services such as provided by media-based domains (e.g., including streaming video services, streaming music services, etc.), etc.), where a browser may limit the use of cookies to first parties.

Further, while each domain in FIG. 1 is illustrated as associated with a different one of the servers 102, 106, 108, 114 (for ease of reference), it should be appreciated that one or more of the servers may be combined in other embodiments (to thereby provide the corresponding domain(s)).

Moreover, despite the separate domains described above, it should be appreciated that a hierarchy of different domains may be imposed in lieu of different domains for certain embodiments. For example, the common domain (at the common domain server 114) may be a parent domain, such as, for example, clicktopay.com, and the SRC domain (at the servicer provider server 106) may be a sub-domain of the parent domain, such as, for example, Bank1.clicktopay.com, etc. In such embodiments, the domain and sub-domain may be hosted by the same or different server(s).

With continued reference to FIG. 1, the system 100 also includes a user 116, which is a consumer in this embodiment, and who is intent on transacting with the first entity (associated with the entity server 102) (e.g., to purchase one or more products, etc.). The user 116 is associated with a computing device 118, which may include a mobile device (e.g., a smartphone, a tablet, a laptop, etc.) or other computing device, etc. The computing device 118 includes a browser 120, which configures the computing device 118 to access one or more websites, at one or more servers, as defined by the relative domains of the websites. The browser 120 may include without limitation the GOOGLE CHROME browser, the APPLE SAFARI browser, the MICROSOFT EDGE browser, another browser, etc.

In an example use, then, the user 116 accesses, at the computing device 118, the website 104, via the entity domain (e.g., www.[merchant_name].com, etc.), through the browser 120. In turn, the browser 120 configures the computing device 118 to display the various webpages of the website 104 to the user 116 based on one or more inputs from the user 116 (e.g., navigating the website, selecting products/services, adding products to a shopping cart, etc.). The user 116, in turn, may select one or more products to purchase from the entity and then select a payment page, where a "click to pay" option is displayed to the user 116. In response to the "click to pay" option, the computing device 118 is configured, by the website 104, to execute the SRCi SDK 112, which causes the computing device 118 to display a pop-up browser window to the user 116 accessing a common domain website (e.g., common_domain.com, etc.). The computing device 118, as configured by the common domain website, attempts to recognize the user 116, through one or more cookies in the browser 120. When the user 116 is not recognized (e.g., the user 116 is an unrecognized user, etc.), the computing device 116, as configured by the SRCi SDK 112, access a SRCi website in the interface domain (at the interface server 108) (e.g., example_SRCi_service, etc.). The computing device 118, as configured by the SRCi website, then solicits details for a SRC profile (e.g., name, address, payment credential, consent, etc.) for the user 116, whereby the details, as entered, are provided to the interface server 108. The interface server 108 is configured to encrypt the details (e.g., for a specific SRC service (e.g., as provided by the service provider server 106, etc.), etc.) and then store the encrypted details, as an SRC profile, for the user 116 in memory. The interface server 108 is configured to return the encrypted details to the computing device 118.

The computing device 118, as configured by the SRCi SDK 112, executes the SRC SDK 110. In turn, the computing device 118, as configured by the SRC SDK 110, opens a SRC website in the service domain (e.g., example_SRC-_service, etc.) (of the service provider server 106). The computing device 118, as configured by the SRC website, passes the encrypted details to the service provider server 106, whereby the service provider server 106 is configured to decrypt the details and to initiate a payment account transaction to fund the purchase between the user 116 and the entity using the credential included in the encrypted details. The service provider server 106 is configured to return the transaction status and a federated ID token to the computing device 118.

In turn, if the user 116 has consented to be remembered from "click to pay", the computing device 118, as configured by the SRCi SDK 112, is configured to bind the federated ID token into the browser 120 through the common domain. To do so, the computing device 118 is configured, by the SRCi SDK 112, to access the common domain website (e.g., common_domain.com, etc.) (of the common domain server 114), whereby the federated ID token is passed to the common domain server 114. The common domain server 114 is configured, optionally, to identify the service provider server 106 for the federated ID token, and to solicit a recognition token from the service provider server 106. The service provider server 106, in turn, is configured to verify the federated ID token and to issue the recognition token to the common domain server 114. The common domain server 114 is configured to bind the recognition token into a cookie at the browser 120. The cookie includes the recognition token, the common domain name (e.g., common_domain.com, etc.) (i.e., the cookie is set in the browser 120 through the common domain, and therefore, not the service provider domain), and expiration date for the recognition token (e.g., as defined by the service provider or other party associated with the SRC profile, or services associated therewith), etc.

In this manner, a cookie is set in the browser 120, which enables subsequent click to pay services, for later transactions for the first entity, the service provider, and others (e.g., party agnostic, etc.), as long as the cookie is accessed through the common domain (for instance, where the browser 120 is restricted accordingly).

When the user 116 returns to the website 104 to make another purchase (as a recognized user), the user 116 again selects a payment page, where a "click to pay" option is displayed to the user 116. In response to the "click to pay" option, the computing device 118 is configured, by the website 104, to execute the SRCi SDK 112, which, in turn, causes the computing device 118 to display a pop-up window for the common domain website (e.g., common_domain.com, etc.). The computing device 118, as configured by the common domain (of the common domain server 114), confirms that the recognition token (or the cookie more generally) is not expired (based on the expiration data included in the cookie) and transmits the cookie (or unexpired cookie) associated with the common domain to the common domain server 114. The common domain server 114 is configured to extract the recognition token from each of the received cookies, and also identify an SRC service associated with the extracted recognition token. For each recognition token, the common domain server 114 is configured to transmit a request (including the recognition token) for the associated federated ID token from the respective server, such as, for example, to the service provider server 106. The service provider server 106, in turn, is configured to look up the federated ID token, based on the recognition token, and to return the same to the common domain server 114. The common domain server 114 is configured to then return the federated ID token(s) to the computing device 118. In turn, the computing device 118 is configured, by the SRCi SDK 112, to retrieve the SRC profile for the federated ID token(s) from the interface server 108 and to display the payment account options included in the SRC profile to the user 116.

When the user 116 selects a payment account option, the computing device 118 is configured, by the SRCi SDK 112, to pass details associated with the payment account option (e.g., encrypted details, etc.) to the service provider server 106 via the SRC SDK 110 (i.e., in the service domain). Consistent with the above, the service provider server 106 is configured to decrypt the details, to initiate a payment account transaction to fund the purchase, and to return the transaction status to the computing device 118.

It should be understood that the servers 102, 106, 108, 114 and/or computing device 118 illustrated in FIG. 1 may communicate through one or more networks, as indicated by the arrowed lines. The one or more networks may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, the networks may include multiple different networks, such as a private network accessible between the servers 106, 108 and 114, and separately, the public Internet, which is accessible by the entity server 102 and the computing device 118 to access the servers 106, 108 and 114, for example, etc.

While one first entity server 102, one service provider server 106, one interface server 108, one common domain server 114, and one computing device 118 are illustrated as included in the system 100, it should be appreciated that any number of these entities and/or persons (and their associated components) may be included in the system 100, or may be included as a part of systems in other embodiments, consistent with the present disclosure.

Figure 2:
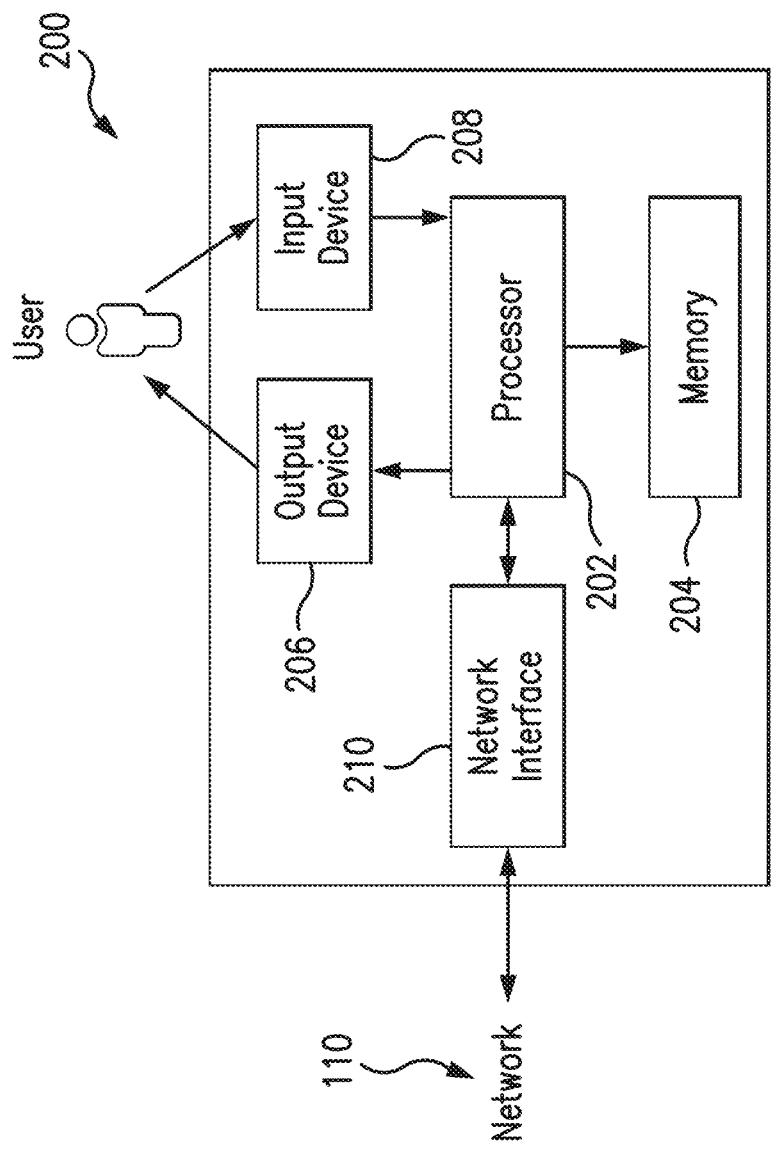
FIG. 2 is a block diagram of an example computing device that may be used in the system of FIG. 1.

FIG. 2 illustrates an example computing device 200 that may be used in the system 100. The computing device 200 may include, for example, one or more servers, workstations, personal computers, laptops, tablets, smartphones, PDAs, POS devices, etc. In addition, the computing device 200 may include a single computing device, or it may include multiple computing devices located in close proximity or distributed over a geographic region, so long as the computing devices are specifically configured to function as described herein. In particular, in the example system 100 of FIG. 1, each of the first entity server 102, the server 106, the server 108, the server 114, and the computing device 118 may include and/or may be implemented in a computing device the same or similar to the computing device 200. That said, however, the system 100 should not be considered to be limited to the computing device 200, as described below, as different computing devices and/or arrangements of computing devices may be used. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, credentials, tokens, profiles, SDKs, and/or other types of data (and/or data structures) suitable for use as described herein. Furthermore, in various embodiments, computer-executable instructions (e.g., SDKs, etc.) may be stored in the memory 204 for execution by the processor 202 to cause the processor 202 to perform one or more of the functions described herein (e.g., one or more of the operations of the methods illustrated herein, etc.), such that the memory 204 is a physical, tangible, and non-transitory computer readable storage media. Such instructions often improve the efficiencies and/or performance of the processor 202 that is performing one or more of the various operations herein (e.g., performance of the computing device 118, the computing devices 200 at the various parts of the system 100, etc.) and, in doing so, may transform the processor 202 into a special-purpose processor or device. It should be appreciated that the memory 204 may include a variety of different memories, each implemented in one or more of the functions or processes described herein.

In addition in the example embodiment, the computing device 200 includes an output device 206 that is coupled to (and is in communication with) the processor 202. The output device 206 outputs information (e.g., solicitation of profile details (including a consent), etc.), either visually or audibly, to a user of the computing device 200, for example, the user 116, users associated with other parts of the system 100, etc. Various interfaces may also be displayed at computing device 200, and in particular at output device 206, to display such information. The output device 206 may include, without limitation, a presentation unit such as a liquid crystal display (LCD), a light-emitting diode (LED) display, an organic LED (OLED) display, an "electronic ink" display; speakers; another computer; etc. In some embodiments, the output device 206 may include multiple devices.

The computing device 200 also includes an input device 208 that receives inputs from the user 116 of the computing device 200 (i.e., user inputs) such as, for example, selections of pay options, entry of credentials, providing consent, etc. The input device 208 is coupled to (and is in communication with) the processor 202 and may include, for example, a keyboard, a pointing device, a mouse, a stylus, a touch sensitive panel (e.g., a touch pad or a touch screen, etc.), another computing device, and/or an audio input device. Further, in various example embodiments, a touch screen, such as that included in a tablet, a smartphone, or similar device, may behave as both the output device 206 and the input device 208.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, for example, in the system 100, etc. Further, in some example embodiments, the computing device 200 may include the processor 202 and one or more network interfaces (including the network interface 210) incorporated into or with the processor 202.

FIGS. 3A-4 illustrate an example method 300 for providing use of a common domain. The example method 300 is described with reference to the system 100 of FIG. 1. Further reference is also made to the computing device 200. However, it should be understood that the method 300 (and other methods herein) are not limited to the system 100 or the computing device 200, as the method 300, for example, may be implemented, at least in part, in other parts of suitable systems, or in multiple other computing devices or systems. Likewise, the systems and the computing devices herein (including the system 100 and the computing device 200) should not be understood to be limited to the example method 300.

In connection with the above, the method 300 is associated with the user's interaction with the website 104, which is associated with the first entity (and the entity server 102). It should be appreciated that, in this example, the user 116, and more specifically, the computing device 118, is new to (or not remembered by) the website 104 (whereby the user 116 generally is an unrecognized user with regard to the website 104, etc.). Additionally, it should be appreciated that different browsers may have different functionality and/or limitations.

Initially in the method 300, at 302, the computing device 118, via the website 104, attempts to determine if the device 118 is recognized, based on a cookie stored by the browser 120. Where the browser 120 permits first-party cookies in a third-party context, the website 104 is permitted to recognize the computing device 118 and proceed in a conventional manner to provide for checkout (generally not shown in FIGS. 3A-3D).

In method 300, however, the browser 120 does not permit the first-party token in the third-party context, whereby the method 300 proceeds.

As such, as shown in FIGS. 3A-3D, the user 116 accesses the website 104 and proceeds to checkout for the purchase of one or more products, whereby the computing device 118 displays, at 304, an option for "click-to-pay". At 306, the user 116 triggers the "click to pay" option, which causes the computing device 118 to open a browser window, at 308. The pop-up browser window is identified by a reference, which is passed to the SRCi SDK 112, at 312. The computing device 118 then directs, by the SRCi SDK 112, the pop-up browser window to the common domain and requests the browser recognize the device for the common domain, at 314. For this specific example, at this point in method 300, there are no cookies associated with the common domain, at 316.

Next, the computing device 118 opens, at 318, a page in the pop-up browser window in the interface domain (e.g., example_SRCi_service.com, etc.) and informs, at 320, the interface server 108 that the user 116 is not recognized.

In turn, the interface server 106 displays, at 322, an entry form for a credential to the user 116, via the browser window, at the computing device 118. The user 116 then enters, at 324, the credential, as requested. The credential may include a payment account number, expiration date, security code, etc., and the credential may be provided with a name, address, contact information, electronic serial number (ESN), MAC address, etc., specific to the user 116 and/or the computing device 118. The interface server 106 receives the information from the computing device 118, and encrypts, at 326, at least the credential (broadly, details) in a manner consistent with the SRC service (e.g., associated with the service provider server 106, etc.).

The interface server 106 passes, at 328, the encrypted details to the computing device 118, and in particular, the SRCi SDK 112. The computing device 118 passes the encrypted details from the SRCi SDK 112 to the SRC SDK 110, at 330, and the computing device 118 opens, at 332, a browser window directed to the SRC domain (in place of the interface domain). Notably, in FIGS. 3A-3D, the SRC domain is a sub-domain of the common domain (e.g., Bank1.common_domain.com, etc.). The computing device 118, in doing so, communicates the encrypted details to the server 106. The server 106 displays, at 334, a transaction confirmation page to the user 116, at the computing device 118. In response, the user 116 confirms payment, at 336, and further consents to have the credential remembered by the browser 120.

At 338, the server 106 decrypts the details (including the credential) and facilitates a transaction for the one or more products. In connection therewith, the service provider server 106 generates, retrieves, etc. a federated ID token. In addition, in this example the server 106 generates a recognition token, binds the recognition token to the federated ID token (in a memory of the server 106) and further requests a cookie be set in the computing device 118. The computing device 118, via the browser 120, compiles and stores a cookie for the credential, which includes the recognition token, and is associated with the common domain, as the SRC interaction is in a sub-domain of the common domain.

The server 106 returns, at 340, a checkout result to the computing device 118, via the SRC website, as provided by the SRC SDK 110. The computing device 118 passes the checkout result from the SRC SDK 110 to the SRCi SDK 112, at 342, and then to the website 104, at 344. At 346, the pop-up-browser window closes, and at 348, the website 104 displays a checkout confirmation to the user 116.

It should be appreciated that the binding of the recognition token and the federated ID token is as described above because the SRC domain is a sub-domain of the common domain. FIG. 3B illustrates an aspect of the method 300, and the binding, where the SRC domain is not a sub-domain of the common domain. In particular, at 350 (which would occur upon passing the checkout result to the SRCi SDK 112 (at 342) in FIGS. 3A-3D), the computing device 118, through the SRCi SDK 112, opens a pop-up browser window in the common domain. The computing device 118 passes, at 352, the federated ID token to the common domain, and the computing device 118 requests, at 354, the common domain server 114 to bind the federated ID token, via the service provider associated with the token. At 356, the common domain server 114 identifies the service provider (e.g., from the token, as a default, etc.) and submits the federated ID token to the server 106 (in this example). At, 358, the server 106 verifies the federated ID token, and returns the recognition token linked to the federated ID token to the common domain server 114.

The common domain server returns, at 360, the recognition token, and associated detail (e.g., expiration, etc.) to the computing device 118, whereupon a cookie is set through the common domain browser window. The cookie, like above, includes the recognition token, and is requested in the common domain, whereby the common domain is the first party to the cookie.

FIGS. 5A-6B illustrate an example method 400 for providing use of a common domain. The example method 400 is described with reference to the system 100 of FIG. 1. Further reference is also made to the computing device 200. However, it should be understood that the method 400 (and other methods herein) are not limited to the system 100 or the computing device 200, as the method 400, for example, may be implemented, at least in part, in other parts of suitable systems, or in multiple other computing devices or systems. Likewise, the systems and the computing devices herein (including the system 100 and the computing device 200) should not be understood to be limited to the example method 400.

In connection with the above, the method 400 is associated with the user's interaction with the website 104, which is associated with the first entity. It should be appreciated that the user 116, and more specifically, the computing device 118, has already performed the method 300, whereby the computing device 118 is recognized, as explained further below.

Like above, different browsers may have difference functionality and/or limitations. Therefore, initially, at 402, the computing device 118, via the website 104, attempts to determine if the device 118 is recognized, based on a cookie. Where the browser 120 permits first-party cookies in a third-party context, the website 104 is permitted to recognize the computing device 118 and proceed in a conventional manner to provide for checkout (generally not shown in FIG. 4). In method 400, however, the browser 120 does not permit the first-party token in the third-party context, whereby the method 400 proceeds.

As shown in FIGS. 5A-6B, the user 116 access the website 104 and proceeds to checkout for the purchase of one or more products, whereby the computing device 118 displays, at 404, an option for click to pay. At 406, the user 116 triggers the click to pay option, which causes the computing device 118 to open a browser window, at 408. The browser 120 opens the browser window, at 410, whereby the browser window is identified by a reference, which is passed to the SRCi SDK 112, at 412. The computing device 118 then directs, by the SRCi SDK 112, the browser window to the common domain (e.g., clicktopay-.com, etc.) and requests the browser recognize the device for the common domain, at 414.

The method 400 proceeds to FIGS. 6A-6B, where the computing device 118, and specifically, the browser 120 recognizes the common domain and retrieves available cookies for the command domain, at 414. As indicated above, each of the cookies includes a recognition token, a domain name (i.e., the common domain in this example), an expiration indication for the recognition token, etc. It should be understood that the browser 102 may include a number of cookies for the common domain, each associated with a different service provider and/or SRC profile.

The computing device 118 submits, at 416, the cookies to the common domain server 114. In turn, at 418, the common domain server 114 reads each of the cookies, including the specific domain and/or sub-domain of the cookies and thus, the service provider associated with the cookie. The common domain server 114 then, for each cookie, requests the associated federated ID token from the service provider server 106, for example, at 420. The server 106, in turn, verifies the recognition token, identifies the associated or linked federated ID token and returns the federated ID token to the common domain server 114, at 422. In instances where the recognition token is expired, the service provider server 106 may replace the recognition token with a new/unexpired recognition token.

Upon receipt of the one or more federated ID tokens, the common domain server 114 provides, at 424, the tokens to the computing device 118, and in particular, the common domain browser window, which passes the same to the SRCi SDK 112, at 426.

With reference again to FIGS. 5A-5D, the computing device 118, through the SRCi SDK 112, requests, at 430, the card details associated with each of the federated ID tokens from the SRC SDK 110. The computing device 118, through the SRC SDK 110, responds, at 432, with the card details for the tokens (e.g., masked card details, where only the type of card and the final four numbers are included, etc.) to the SRCi SDK 112. The computing device 118, through the SRCi SDK 112, then opens a pop-up browser window, in the interface domain, at 434, and submits the masked card details to the interface server 108, at 436.

At 438, the interface server 106 displays the masked card details to the user 116, via the pop-up browser window at the computing device 118. The user 116 selects, at 440, one of the cards, which is provided to the interface server 108. The interface server 108 then submits, at 442, the card identifier for the selected card to the SRCi SDK 112, which in turn, provides, at 444, the card identifier to the SRC SDK 110. The computing device 118, through the SRC SDK 110, then opens, at 446, a pop-up browser window in the SRC domain, whereby the SRC domain replaces the interface domain. The card identifier is provided thereby to the server 106. At 448, the server 106 displays the purchase detail for the transaction, and the user confirms, at 450, to the server 106, permission to proceed with the payment.

At 452, the service provider server 106 facilitates a transaction for the one or more products. The server 106 returns, at 454, a checkout result to the computing device 118 to SRC SDK 110. The computing device 118, through the SRC SDK 110, passes the checkout result from the SRC SDK 110 to the SRCi SDK 112, at 456, and then, the SRCi SDK 112 pass the checkout result to the website 104, at 458. At 460, the pop-up-browser window is closed, and at 462, the website 104 displays a checkout confirmation to the user 116.

FIGS. 7A-7B illustrate an example method 500 for providing use of a common domain. The example method 500 is described with reference to the system 100 of FIG. 1. Further reference is also made to the computing device 200. However, it should be understood that the method 500 (and other methods herein) are not limited to the system 100 or the computing device 200, as the method 500, for example, may be implemented, at least in part, in other parts of suitable systems, or in multiple other computing devices or systems. Likewise, the systems and the computing devices herein (including the system 100 and the computing device 200) should not be understood to be limited to the example method 500.

In connection with the above, the method 500 is associated with the user's interactions in order to unbind the browser 120 from the service (e.g., SRC service, etc.) offered by the service provider, via the service provider server 106.

It should be appreciated that the method 500 initiates based on a request to unbind the browser 120 from the service, which may originate at the bowser 120 from the user 116, via the website 104, for example, or another website specific to the interface domain and/or the common domain. From the website 104, the computing device 118, through the SRCi SDK 112, opens a pop-up browser window in the common domain, at 502, and then submits an unbind message, at 504, to the common domain, where the unbind message includes the federated ID token (e.g., as retrieved or received from the server 106, etc.), which is indicative of the SRC profile.

The computing device 118, through the common domain browser window, submits, at 506, the unbind message, including the federated ID token to the common domain server 114, and also provides, at 508, the cookies to the common domain server 114. Next, at 510, the common domain server 114 reads the cookies for the common domain (e.g., clicktopay.com), and identifies the recognition tokens from the cookies having the common domain. The common domain server 114, for each recognition token, submits, at 512, to the service provider server 106 (specific to the federated ID token), an unbind request, which includes the federated ID token and the recognition token(s) from the cookies. At 514, the service provider server 106 verifies the recognition token in the request matches the federated ID token and invalidates the recognition token, in response to a match. The service provider server 106 provides a result, at 516, which indicates that the recognition token has been invalidated, or the recognition token was not found.

The common domain server 114 keeps track of which recognition tokens are invalidated, and which are not found, at 518. After each of the recognition tokens is submitted to a respective service provider server, or as results are received, the common domain server 114 resets or invalidates the cookies associated with the recognition tokens, which were invalidated, thereby unbinding the SRC profile of the user 116 from the browser 120 of the computing device 118.

In view of the above, the systems and methods herein permit a common domain to be used in connection with browser functionality, where first-party tokens in a third-party context are not permitted. In this manner, the common domain provides for options to remember credentials through recognition tokens associated with cookies in the common domain, and to use the credentials through the cookies, as accessed through the common domain. The common domain as introduced, here, provides a new architectural component used to store the recognition data/token in local storage on the client device, as a cookie in the browser. The common domain is provided to then support recognition of the returning users, as above, where first-party cookies in the third-party context cannot be read. As such, the common domain and/or recognition tokens are useful in identifying the same computing device and/or browser therein, because it leverages this local storage through cookies. The common domain server, for example, then is independent of the service provider systems and hosts a web component supporting the extended, desired functionality.

Again, and as previously described, it should be appreciated that the functions described herein, in some embodiments, may be described in computer executable instructions stored on a computer readable media, and executable by one or more processors. The computer readable media is a non-transitory computer readable storage medium. By way of example, and without limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the steps and/or operations illustrated and/or described herein.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the phrase "at least one of" and the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in implementing a common domain for user recognition in a browser, the method comprising:
   receiving, by a computing device, a recognition token associated with a profile;
   setting, by the computing device, via a browser accessing a common domain, a cookie in the browser, the cookie including the recognition token;
   in response to a request for a service, via a user, through the browser accessing an entity domain associated with an entity, accessing, by the computing device, the common domain;
   accessing, by the computing device, via the browser accessing the common domain, the cookie and submitting the cookie to a common domain server;
   receiving, from the common domain server, a federated ID token associated with the recognition token for the service; and
   retrieving, by the computing device, via the browser, the profile associated with the user based on the federated ID token, thereby permitting the computing device to initiate an interaction with the entity, via the browser accessing the entity domain, based on a credential included in the profile.

2. The computer-implemented method of claim 1, wherein the browser is restricted from permitting access to cookies by a domain other than the common domain.

3. The computer-implemented method of claim 1, wherein the service includes a secure remote commerce (SRC) service; and
   wherein the profile includes a SRC profile specific to a provider of said service.

4. The computer-implemented method of claim 3, wherein the cookie includes a name of the common domain and/or an expiration date for the recognition token.

5. The computer-implemented method of claim 3, further comprising initiating the interaction by submitting at least part of the SRC profile to the provider.

6. The computer-implemented method of claim 1, wherein the common domain is associated with a common domain server; and
   wherein the method further comprises:
      receiving, by the common domain server, the cookie from the computing device;
      identifying a provider based on the cookie;
      retrieving, by the common domain server, the federated ID token from the identified provider based on the recognition token included in the cookie; and
      returning, by the common domain server, the federated ID token to the computing device.

7. The computer-implemented method of claim 1, wherein the service is associated with a sub-domain of the common domain.

8. A system for use in implementing a common domain for user recognition in a browser, the system comprising a computing device configured to:
   receive a recognition token associated with a profile;
   set, via a browser accessing a common domain, a cookie in the browser, the cookie including a recognition token;
   in response to a request for a service, via a user, through the browser accessing an entity domain associated with an entity, access the common domain;

access, via the browser accessing the common domain, the cookie and submit the cookie to a common domain server;

receive, from the common domain server, a federated ID token associated with the recognition token for the service; and retrieve, via the browser, the profile associated with the user based on the federated ID token, thereby permitting the computing device to initiate an interaction with the entity, via the browser accessing the entity domain, based on a credential included in the profile.

9. The system of claim 8, wherein the browser is restricted from permitting access to cookies by a domain other than the common domain.

10. The system of claim 9, wherein the service includes a secure remote commerce (SRC) service; and wherein the profile includes a SRC profile specific to a provider of said service.

11. The system of claim 10, wherein the computing device is configured to initiate the interaction by submitting at least part of the SRC profile to the provider.

12. The system of claim 9, wherein the cookie includes a name of the common domain and/or an expiration date for the recognition token.

13. The system of claim 8, further comprising a common domain server associated with the common domain, the common domain server configured to:

receive the cookie from the computing device;
identify a provider based on the cookie;
retrieve the federated ID token from the identified provider based on the recognition token included in the cookie; and
return the federated ID token to the computing device.

14. The system of claim 8, wherein the service is associated with a sub-domain of the common domain.

15. A non-transitory computer-readable storage medium comprising executable instructions, which when executed by at least one processor of a computing device, cause the at least one processor to:

receive a recognition token associated with a profile;

set, via a browser accessing a common domain, a cookie in the browser, the cookie including a recognition token;

in response to a request for a service, via a user, through the browser accessing an entity domain associated with an entity, access the common domain;

access, via the browser accessing the common domain, the cookie and submit the cookie to a common domain server;

receive, from the common domain server, a federated ID token associated with the recognition token for the service; and retrieve, via the browser, the profile associated with the user based on the federated ID token, thereby permitting the computing device to initiate an interaction with the entity, via the browser accessing the entity domain, based on a credential included in the profile.

* * * * *